(12) United States Patent
Ulrich et al.

(10) Patent No.: US 6,621,953 B1
(45) Date of Patent: Sep. 16, 2003

(54) OPTICAL ARRANGEMENT FOR TRANSMITTING SHORT LASER PULSES IN OPTICAL FIBERS

(75) Inventors: Heinrich Ulrich, Heidelberg (DE); Rolf Borlinghaus, Dielheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 09/744,058

(22) PCT Filed: Jul. 6, 1999

(86) PCT No.: PCT/DE99/02095

§ 371 (c)(1),
(2), (4) Date: Jan. 18, 2001

(87) PCT Pub. No.: WO00/05613

PCT Pub. Date: Feb. 3, 2000

(30) Foreign Application Priority Data

Jul. 23, 1998 (DE) .......................................... 198 33 025

(51) Int. Cl.$^7$ ................................................. G02B 6/32
(52) U.S. Cl. .............................. 385/31; 385/33; 385/34; 385/140
(58) Field of Search ............................. 385/31, 39, 88, 385/33, 34, 140; 359/368–369, 385–389

(56) References Cited

U.S. PATENT DOCUMENTS

| | | | | |
|---|---|---|---|---|
| 4,588,957 A | * | 5/1986 | Balant et al. | 359/337.5 |
| 4,928,316 A | * | 5/1990 | Heritage et al. | 359/154 |
| 5,777,342 A | | 7/1998 | Baer | 250/492.2 |
| 5,956,173 A | * | 9/1999 | Svelto et al. | 359/332 |
| 5,995,281 A | * | 11/1999 | Simon et al. | 359/368 |
| 6,178,041 B1 | * | 1/2001 | Simon | 359/368 |
| 6,269,206 B1 | * | 7/2001 | Simon et al. | 385/31 |

FOREIGN PATENT DOCUMENTS

| | | | | |
|---|---|---|---|---|
| DE | 196 22 359 A | 12/1997 | ......... | G02B/21/00 |
| DE | 197 55 361 A | 6/1998 | ......... | H04B/10/18 |
| GB | 2 338 568 A | 12/1999 | ......... | G02B/23/26 |

OTHER PUBLICATIONS

Langley, A. J. et al.: "High–Brightness Femtosecond Laser Using Titanium–Sapphire Technology and Amplification in Dyes", Applied Optics, Optical Society of America, vol. 33, No. 18, pp. 3875–3880, Jun. 20, 1994.

Kempe, M. et al.: "Spatial and Temporal Transformation of Femtosecond Laser Pulses by Lenses with Annular Aperture", Optics Communications, North–Holland Publishing Co., vol. 89, No 2/3/4, pp. 119–125, May 1, 1992.

Fork, R. L. et al.: "Femtosecond Optical Pulses", IEEE Journal of Quantum Electronics, IEEE Inc., vol. QE–19, No. 4, Apr. 1983.

Atherton, B. W. et al.: "Pre–Chirped Fiber Transport of 800 nm 100 fs Pulses", Processing of the SPIE, Jan. 29, 1998.

French, P. M. W.: "The Generation of Ultra–Shaort Laser Pulses", Reports on Progress in Physics, vol. 58, No. 2, pp. 169–262, Feb. 1995.

* cited by examiner

*Primary Examiner*—Brian Healy
*Assistant Examiner*—Kevin S Wood
(74) *Attorney, Agent, or Firm*—Simpson & Simpson, PLLC

(57) ABSTRACT

The invention relates to an optical arrangement for transmitting short laser pulses in optical fibers (2), especially for injection into a laser microscope, preferably for use in two-photon laser microscopy. The inventive arrangement comprises a short-pulse laser light source (1) and at least one optical fiber (2). An optical device (3) for temporarily modifying the laser pulses is provided between the laser light source (1) and the optical fiber (2). The optical arrangement is provided for compensating an unintentional fiber dispersion and non-linear effects resulting from high energy densities, mainly self-phase modulation. The invention is characterized in that the optical device (3) is configured as a section which is, for the most part, comprised of a transparent, dispersive medium and which is located in the beam path (4) in front of the optical fiber (2) which serves the time extension of the laser pulses (pulse spreading).

21 Claims, 2 Drawing Sheets

OPTICAL ARRANGEMENT FOR TRANSMITTING SHORT LASER PULSES IN OPTICAL FIBERS

CROSS-REFERENCE TO RELATED APPLICATIONS

The present application is the U.S. national stage under 35 U.S.C. 371 of International Application No. PCT/DE99/02095 filed Jul. 6, 1999 claiming priority of German Patent Application No. 198 33 025.1 filed Jul. 23, 1998.

BACKGROUND OF THE INVENTION

The invention relates to an optical arrangement for transmitting short laser pulses in optical fibers, especially for insertion in a laser microscope, preferably for use in 2-photon laser microscopy using a short pulse laser source and at least one optical fiber, an optical device for changing the time of the laser pulses being provided between the laser light source and the optical fiber.

The insertion of short laser pulses in a laser microscope is preferably accomplished using an optical fiber, thereby simultaneously achieving high stability and flexibility. In the transmission of ultra-short light pulses, essentially two interfering effects have appeared in practice.

On the one hand, the light pulses are extended by fiber dispersion, typical values being in about 1 ps/m at 100 fs pulses. On the other hand, even at an average output of a few milliwatts, disturbances in the transmission of pulses occur due to the non-linear effects resulting from the high energy density in the fiber. This primarily involves self-phase modulation (SPM).

In known arrangements for the transmission of short pulses using optical fibers, one is already confronted in practice by undesired extension of pulses as a result of positive fiber dispersion, namely due to the side effect of a known corresponding negative dispersion in front of the optical fiber. Such a negative dispersion in front of the fiber can be realized, for example, by using prisms or gratings or grating systems. In the process, the pulse width at the end of the fiber is set to the original pulse width or to a longer pulse width. One may refer to German Patent 196 22 359 A1 as just one example.

However, if one sets the original pulse width using appropriate measures, the self-phase modulation effects limit the output of light transmission to a few milliwatts. In practice, this is not acceptable.

A method is known from Atherton B. W., Reed M. K., Proceedings of SPIE Vol. 3269, 1998, "Prechirped fiber transport of 800 nm 100 fs pulses", according to which the light pulse only past the fiber is minimized to the original pulse width using an additional optical element so that the fiber does not "see" short light pulses at any position. Consequently, there are no self-phase modulation effects, or only minimal ones.

The structural measures cited above have been used in the prior art for short-pulse transmission in optical fibers, but have a complex design and furthermore are expensive to adjust. In particular these arrangements are always wavelength-dependent. Due to both the complicated structure and the expensive adjustment, the known arrangements appear to be only marginally appropriate.

BRIEF SUMMARY OF THE INVENTION

The object of the present invention is to configure and further develop an optical arrangement for the transmission of short laser pulses in optical fibers such that undesired fiber dispersion and non-linear effects as a result of high energy densities, especially self-phase modulation, are substantially prevented or compensated using simple means.

The optical arrangement according to the invention for transmission of short light pulses in optical fibers, meets the aforesaid objective by implementing an optical device between the laser light source and the optical fiber for changing the time of the laser pulses. The optical arrangement is characterized in that the optical device for changing the time of the laser pulses is configured as a segment consisting at least substantially of a transparent, dispersive medium in the beam path in front of the optical fiber and is used to extend the time of the laser pulses (pulse broadening).

According to the present invention, it is first recognized that an extension of the light pulses is required in order to prevent the aforementioned problems. Accordingly, a segment, made of glass for example, which is used to extend the time of the light pulses, is provided between the short-pulse laser light source and the input of the optical fiber. A segment of this type—in the beam path of the short-pulse laser light in front of the optical fiber—ensures that the material dispersion within the range of normal dispersion—under about 1500 nm wavelength—causes the red portion of the light pulses to run faster than the blue portion. Accordingly, a "smearing" of the time of the laser pulse takes place. The degree of pulse dispersion therefore depends on the length of the segment and on the dispersion parameter $\beta_2$ of the medium used.

The segment provided in the beam path in front of the optical fiber could be configured by a transparent container filled with a suitable liquid. The liquid—transparent and dispersive—in an advantageous way could be a silicone oil.

In principle, the segment could be designed as an optically homogenous isotropic medium. In concrete terms, the medium could be a solid body, for instance an isotropic crystal or plastic with corresponding properties.

Within the context of an especially beneficial exemplary embodiment, the segment or the medium is formed of glass, whereby in concrete terms it can be a glass body. This glass body can in turn be configured as a cylindrical glass block or as a cubic glass block, which in the simplest exemplary embodiment is configured as a monolithic block.

It is also conceivable that the optical device may comprise a plurality of modular glass blocks that can be combined into one overall block, both the monolithic single block and the glass blocks that can be combined into one block being interchangeable. Any definable segment can be made out of glass, the modular construction providing for alteration of, on the one hand, the dispersion parameter and, on the other hand, the length of the segment. In particular a combination of two wedge-shaped glass blocks in the sense of a sliding wedge pair, which enables a simple variation of the overall block length in a beneficial manner, is conceivable. The glass block or blocks in this context can be interchangeable.

In an especially beneficial manner, the optical device has a large dispersion parameter $\beta_2$. A dispersion parameter this large offers the possibility of keeping the length of the segment as small as possible. Thus, the optical device could, for example, be configured so that an approximately 80 femtosecond light pulse can be expanded to about 280 femtoseconds by using a glass segment only 5 cm long. In this way the threshold for self-phase modulation in optical fibers is increased by an approximate factor of 3.5.

The glass selected for the medium must have suitable optical characteristics. Thus, in this context it can be a special type of glass. Namely, in a beneficial way, this can be the optical glass SF10 (heavy flint 10).

If retro-reflections of the laser light on the fiber end return back into the laser light source, under certain circumstances, this leads to disturbances in the laser operation. In this respect, the optical device can be formed in a beneficial way as a Faraday rotator or as a combination of a Faraday rotator with an additional optical device. The Faraday rotator permits effective use with respect to a wide adjustment band of the emission wavelength of the laser light source. The Faraday rotator is also capable of suitably rotating the polarization of the emitted laser light so that the polarization direction of the retro-reflection of the optical fiber situated downstream in the beam path is rotated back to the laser by the same amount. In this way the returning light can be suppressed by a linear polarizer arranged between the laser light source and the Faraday rotator. The polarizer is oriented parallel to the direction of polarization of the laser light emitted by the laser light source.

In order to minimize the pulse spread due to dispersion, which is added to the pulse spread due to the glass segment, a relatively short optical fiber should be used, for example an optical fiber with a length of 0.5 m. In this respect, it is possible to maintain pulse widths of scarcely under 1 ps at the end of a 0.5 m long optical fiber.

The arrangements known from the related art use so-called picosecond lasers specifically in order to keep both the self-phase modulation effects and the dispersion effects as small as possible. Accordingly, titanium-sapphire lasers mostly working in the picosecond range are used, which are more technically complex and therefore more expensive than titanium-sapphire lasers working in the femtosecond range. When seen from the functional principle of the titanium-sapphire laser, pulse widths in the range of 100 femtoseconds must be viewed as preferred pulse widths, making it possible to use more economical and compact femtosecond lasers. These lasers can be used according to the claimed concept in a trouble-free manner, the disadvantages known from the prior art being effectively prevented.

BRIEF DESCRIPTION OF THE SEVERAL VIEWS OF THE DRAWING

There are then various possibilities for configuring and further developing the concept of the present invention in a beneficial manner. In this regard, one may refer to the following explanation of two non-limiting exemplary embodiments of the invention relating to the drawing. Along with the explanation of the preferred exemplary embodiments of the invention relating to the drawing, generally preferred configurations and further developments of the concept are also explained. Shown in the drawing are.

DETAILED DESCRIPTION OF THE INVENTION

Figure 1:
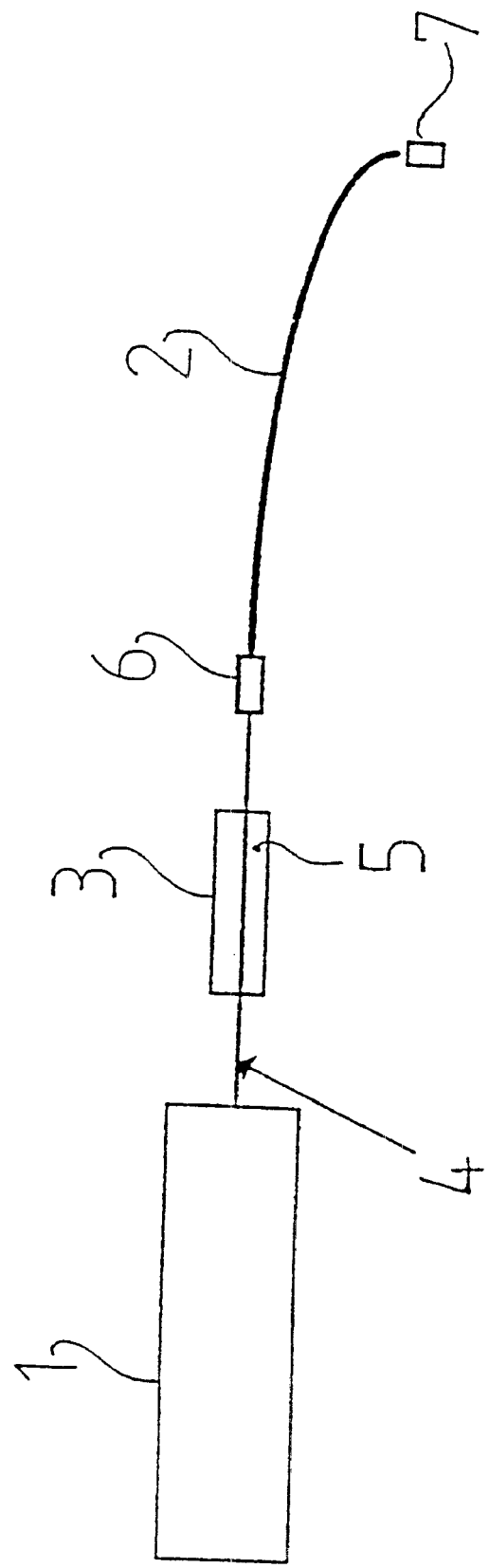
FIG. 1 is a schematic representation of the fundamental structure of an optical arrangement according to the present invention for transmitting short laser pulses in optical fibers.

FIG. 1 shows—schematically—an optical arrangement for transmitting short laser pulses in optical fibers, such an optical arrangement being used for insertion in a laser microscope (not shown in FIG. 1), especially in 2-photon laser microscopy. The optical arrangement comprises a short-pulse laser light source 1 and an optical fiber 2, an optical device 3 being provided between the laser light source 1 and the optical fiber 2.

According to the present invention, optical device 3 is configured as a segment consisting at least substantially of a transparent, dispersive medium in beam path 4 in front of optical fiber 2, this segment being used to extend the time of the laser pulse, i.e. for pulse spreading.

In the exemplary embodiment selected in FIG. 1, the segment is formed by a glass body 5, in a concrete example here being a cubic or cylindrical or prismatic glass block in a monolithic design.

The short laser pulses are extended in time using a glass body 5 according to the general description, the degree of pulse spreading depending on both the length of glass body 5 and its dispersion parameter $\beta_2$.

After running through glass body 5, the laser pulses are inserted at an insertion point 6 into the optical fiber 2 and, after running through optical fiber 2, arrive via an associated fiber output 7 directly in a laser microscope (not shown in FIG. 1).

Figure 2:
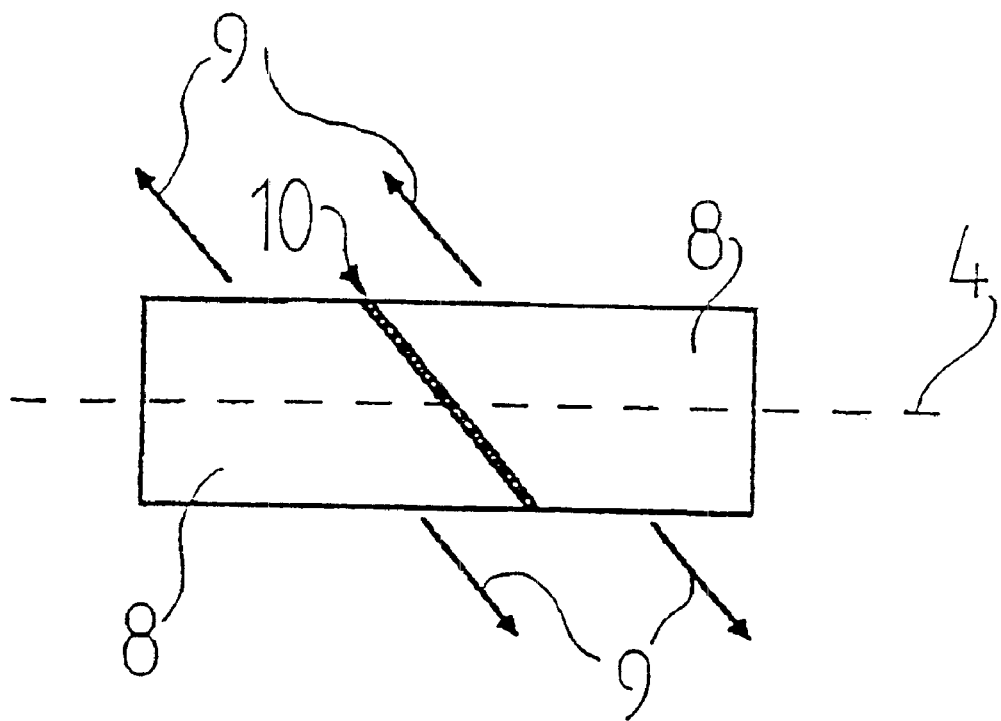
FIG. 2 is a schematic representation of a special embodiment of the segment made of glass, two wedge-form glass blocks (glass prisms) enabling a variation of the length of the segment.

FIG. 2 schematically shows two wedge-form glass blocks 8 (glass prisms) that can move along arrows 9. A reciprocal movement of glass blocks 8 enables continuous adjustment of the segment formed by the dispersive medium in beam path 4 of the laser light. For the sake of simplified representation, the two glass blocks 8 have a gap 10 between their opposing surfaces that can be filled, for example, with an appropriate liquid.

As far as additional configurations of the claimed concept that cannot be derived from the two figures are concerned, one may refer to the general summary part of the description to avoid repetition.

In all other respects, it should be noted that the aforementioned exemplary embodiments are only used for the exemplary discussion of the claimed concept, but said concept is not limited to the exemplary embodiments.

Reference Number List

1 Short-pulse laser light source
2 Optical fiber
3 Optical device
4 Beam path of the laser light
5 Glass body
6 Insertion position of (2)
7 Fiber output of (2)
8 Glass blocks
9 Arrow(s): direction(s) of movement of (8)
10 Gap (between two glass blocks)

What is claimed is:

1. In an optical arrangement for the transmission of short laser-pulses in an optical fiber, said optical arrangement including a short-pulse laser light source, an optical fiber, and an optical device provided in a beam path between said laser light source and said optical fiber for changing the time of said laser pulses, the improvement comprising:

Said optical device being configured from a plurality of segments, each of said segments consisting at least substantially of a transparent, dispersive medium and brought into physical contact with at least one other segment to form a block and wherein said block is positioned in front of said optical fiber and used to extend the time of the laser pulses by a continuous adjustment of the block formed by said segments.

2. The improvement as recited in claim 1, wherein each of said plurality of segments is formed by a transparent container filled with a suitable liquid.

3. The improvement as recited in claim 2, wherein said liquid is a silicone oil.

4. The improvement as recited in claim 1, wherein each one of said plurality of segments is configured as an optically homogeneous, isotropic medium.

5. The improvement as recited in claim 4, wherein said medium is configured as an isotropic crystal.

6. The improvement as recited in claim 4, wherein said medium is made of plastic.

7. The improvement as recited in claim 4, wherein said medium is made of glass.

8. The improvement as recited in claim 7, wherein said medium is configured as a glass body.

9. The improvement as recited in claim 1, wherein each one of said segments in said plurality of segments is a modular glass block to form a plurality of modular glass blocks that can be combined into one overall glass block.

10. The improvement as recited in claim 9, wherein said plurality of modular glass blocks is configured as a sliding block pair for simple variation of the overall block length.

11. The improvement as recited in claim 10, wherein said glass blocks of said sliding block pair are interchangeable.

12. The improvement as recited in claim 1, wherein said optical device has a large dispersion parameter.

13. In an optical arrangement for the transmission of short laser pulses in an optical fiber, said optical arrangement including a short-pulse laser light source, an optical fiber, and an optical device provided in a beam path between said laser light source and said optical fiber for changing the time of said laser pulses, the improvement comprising:

said optical device being configured as a segment consisting at least substantially of a transparent, dispersive medium in said beam path in front of said optical fiber and used to extend the time of the laser pulses, wherein said optical device is configured such that an approximately 80 femtosecond pulse can be spread using a 5-cm-long glass segment to approximately 280 femtoseconds.

14. The improvement as recited in claim 1, wherein said medium is optical glass SF10 (heavy flint 10).

15. The improvement as recited in claim 1, wherein a titanium-sapphire laser is used as said laser light source.

16. The improvement as recited in claim 1, wherein said optical fiber has a length of approximately 0.5 m.

17. In an optical arrangement for the transmission of short laser pulses in an optical fiber, said optical arrangement including a short-pulse laser light source, an optical fiber, and an optical device provided in a beam path between said laser light source and said optical fiber for changing the time of said laser pulses, the improvement comprising:

said optical device being configured as a segment consisting at least substantially of a transparent, dispersive medium in said beam path in front of said optical fiber and used to extend the time of the laser pulses, wherein said optical device functions as a Faraday rotator.

18. The improvement as recited in claim 17, further comprising a polarizer between said laser light source and said optical device, said polarizer being oriented parallel to the direction of polarization of the laser light emitted by said laser light source.

19. The improvement as recited in claim 18, wherein said Faraday rotator rotates the original polarization direction of laser light emitted by said laser light source.

20. The improvement as recited in claim 19, wherein said Faraday rotator rotates the original polarization direction of laser light emitted by said laser light source by 45°.

21. The improvement as recited in claim 1 wherein said plurality of segments is configured as a sliding block pair for simple variation of the overall block length.

* * * * *